Dec. 15, 1931.　　　　A. OSOLIN　　　　1,837,063
SINTERING MACHINE
Filed July 23, 1930
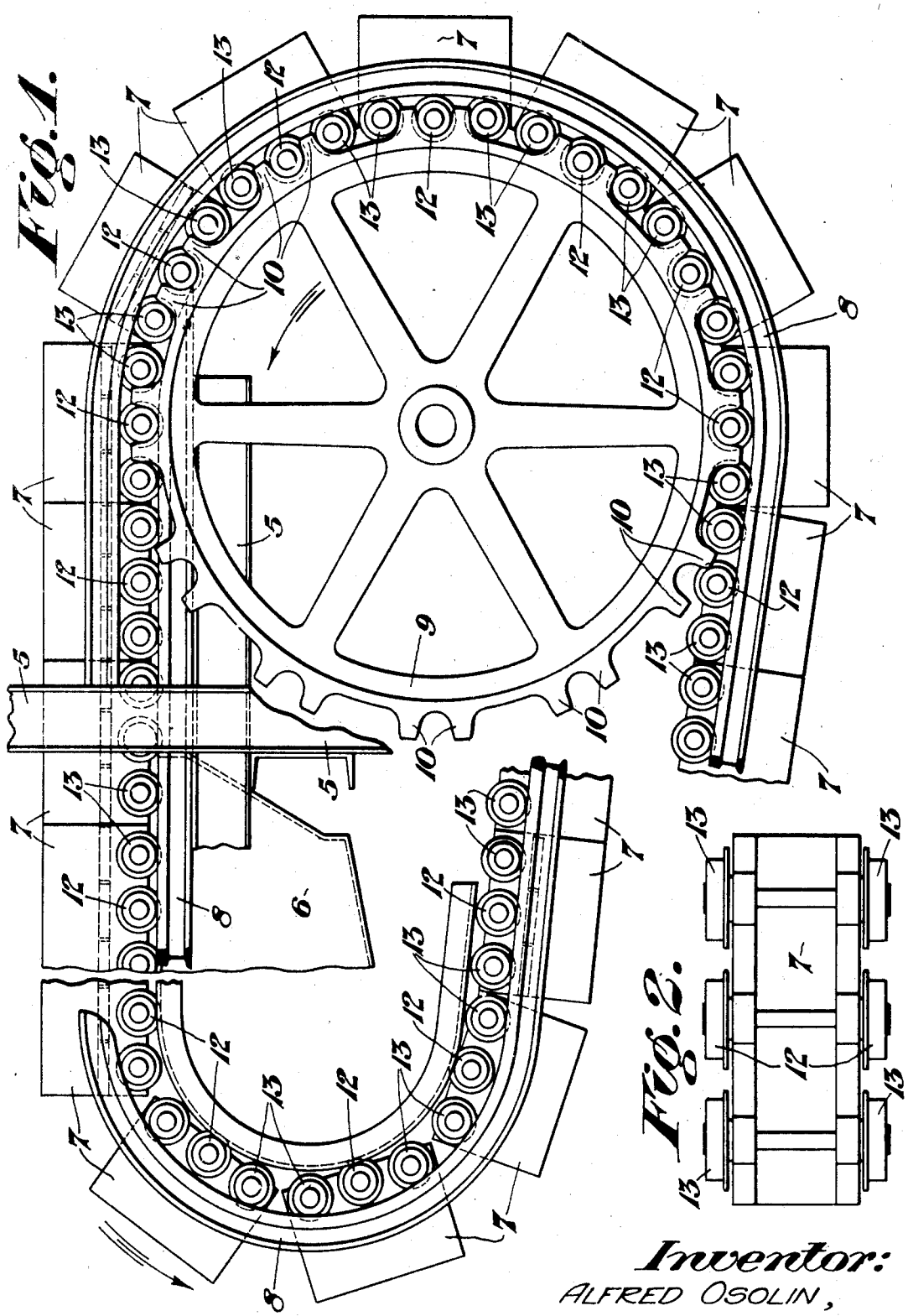
Inventor:
ALFRED OSOLIN,
by: Maine + Rauber
his Attorneys.

Patented Dec. 15, 1931

1,837,063

UNITED STATES PATENT OFFICE

ALFRED OSOLIN, OF CLEVELAND, OHIO

SINTERING MACHINE

Application filed July 23, 1930. Serial No. 470,074.

This invention relates to sintering machines generally and more particularly to machines of that type wherein the ore dust or like matter to be sintered is carried on pallets over a draft flue or wind box, and after the sintering operation the pallets move around the discharge end of the machine on curved rails to an inverted position and dump their contents and roll by gravity on inclined rails to the charging end of the machine, at which point they are picked up by drive sprockets and carried around on curved rails to repeat the cycle.

In machines of this type, considerable wear on the pallet wheels and also on the curved rails at the charging or drive end of the machine results from the sprocket teeth gripping the pallet wheels and sliding them on the rails until the pallets reach a point in line with the vertical center of the drive sprocket.

The present invention contemplates the provision of a particular type of pallet whereby wear on the pallet wheels and machine rails is reduced to a minimum.

In the drawings:—

Figure 1 is a view in side elevation, broken through and moved together to conserve space, of a sintering machine embodying the features of the invention, and Fig. 2 is a bottom plan view of one of the pallets shown in Fig. 1.

The reference numeral 5 designates the supporting beams of frame of the machine and 6 a conventional type of down-draft-flue or wind box over which the pallets 7 bearing the material to be sintered travel on rails or tracks 8. At each end of the machine the tracks are curved, the radius of the curve being smaller at the discharge end of the machine than at the charging or drive end and the lower rails 8 are sloped or inclined downwardly toward the latter end. The pallets are carried around the charging or drive end of the machine by a drive sprocket 9 provided with teeth 10 which are spaced a predetermined distance apart in accordance with the spacing of the wheels of the pallets.

In sintering machines as heretofore constructed, the pallets 7 were provided with only two sets or pairs of wheels and the teeth 10 of the sprockets engaged one or both sets of said wheels in carrying the pallets around the drive end of the machine. This action resulted in "flats" or wear in spots on the pallet wheels and also resulted in wear on the curved portion of the rails, due to the fact that the sprocket teeth would bear against the pallet wheels when the drive was applied and caused them to slide on the tracks until a point in line with the vertical center of the drive sprocket was reached.

The feature of the invention primarily resides in the provision of sprocket engaging devices in the form of wheels 12 which are in addition to the usual pallet wheels 13, the wheels 12 being positioned between the pairs of wheels 13. These wheels 12 engage in between the sprocket teeth 10 and bear the brunt of the drive, leaving the wheels 13 free to roll on the curved rails 8. Wear on the pallet wheels 13 and the curved portion of the rails 8 is thus practically eliminated, resulting in a material reduction in the cost of upkeep of the machine as a whole.

What is claimed as new is:—

1. A sintering machine, comprising in combination a track formed with curved portions at opposite extremities, a drive sprocket, and one or a plurality of pallets mounted for travel on said track, said pallets being provided with pairs of wheels at opposite extremities thereof which normally bear the weight of the pallet and an extra pair of wheels which are disposed between said above named pairs of wheels for exclusive engagement by the teeth of the drive sprocket.

2. A pallet for use with sintering machines of that type wherein the pallets are propelled by a drive sprocket, comprising a body, pairs of wheels at opposite extremities of said body which normally support the weight of the body, and means disposed between said pairs of wheels for exclusive engagement by the teeth of the drive sprocket.

In testimony whereof, I have hereunto set my hand.

ALFRED OSOLIN.